US012646071B2

(12) United States Patent
Fu

(10) Patent No.: US 12,646,071 B2
(45) Date of Patent: Jun. 2, 2026

(54) RISK PREVENTION AND CONTROL METHODS, APPARATUSES, AND DEVICES

(71) Applicant: Alipay (Hangzhou) Information Technology Co., Ltd., Hangzhou (CN)

(72) Inventor: Xinyi Fu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 199 days.

(21) Appl. No.: 18/526,555

(22) Filed: Dec. 1, 2023

(65) Prior Publication Data

US 2024/0104570 A1     Mar. 28, 2024

Related U.S. Application Data

(63) Continuation of application No. PCT/CN2022/093895, filed on May 19, 2022.

(30) Foreign Application Priority Data

Jun. 7, 2021    (CN) .......................... 202110631595.0

(51) Int. Cl.
*G06F 21/62*     (2013.01)
*G06Q 20/40*     (2012.01)

(52) U.S. Cl.
CPC ..... *G06Q 20/4016* (2013.01); *G06F 21/6245* (2013.01)

(58) Field of Classification Search
None
See application file for complete search history.

(56) References Cited

U.S. PATENT DOCUMENTS

2019/0158528 A1*   5/2019   Xia .................... G06Q 20/3223
2019/0171978 A1*   6/2019   Bonawitz ................ G06F 16/95
(Continued)

FOREIGN PATENT DOCUMENTS

CN       105490841       4/2016
CN       110222880       9/2019
(Continued)

OTHER PUBLICATIONS

International Preliminary Report on Patentability in Appln. No. PCT/CN2022/093895, mailed on Dec. 21, 2023, 12 pages (with English translation).
(Continued)

*Primary Examiner* — Joshua Joo
(74) *Attorney, Agent, or Firm* — Fish & Richardson P.C.

(57)     ABSTRACT

In an implementation, an initial risk prevention and control model of a to-be-trained target service corresponding to a classification group that a terminal device belongs to is received from a server. To obtain a risk prevention and control sub-model corresponding to the terminal device and based on pre-stored training sample data including at least data related to a user of the terminal device and the to-be-trained target service, performing model training on the initial risk prevention and control model. To obtain a risk prevention and control model corresponding to the classification group that the terminal device belongs to, sending to the server the risk prevention and control sub-model. The risk prevention and control model is received from the server as acquired data of the to-be-trained target service. Risk prevention and control processing is performed on the acquired data of the to-be-trained target service.

20 Claims, 9 Drawing Sheets

(56) References Cited

U.S. PATENT DOCUMENTS

| | | | |
|---|---|---|---|
| 2020/0050710 A1 | 2/2020 | Shayani et al. | |
| 2020/0202268 A1 | 6/2020 | Retna et al. | |
| 2020/0250677 A1* | 8/2020 | Gu | H04L 63/1416 |
| 2022/0036178 A1* | 2/2022 | Dimitriadis | G06N 3/08 |
| 2022/0104033 A1* | 3/2022 | Ly | G06N 3/08 |
| 2022/0351040 A1* | 11/2022 | Donatelli | G06N 3/098 |
| 2022/0383197 A1* | 12/2022 | Park | G06F 21/6218 |
| 2024/0214405 A1* | 6/2024 | Corron | H04L 63/1483 |

FOREIGN PATENT DOCUMENTS

| | | | |
|---|---|---|---|
| CN | 111008709 | | 4/2020 |
| CN | 111738628 | | 10/2020 |
| CN | 111831523 | | 10/2020 |
| CN | 111866869 | A | 10/2020 |
| CN | 112181971 | | 1/2021 |
| CN | 112256874 | | 1/2021 |
| CN | 112270597 | | 1/2021 |
| CN | 112465626 | | 3/2021 |
| CN | 112488322 | A | 3/2021 |
| CN | 112712182 | | 4/2021 |
| CN | 112819156 | A | 5/2021 |
| CN | 112819180 | | 5/2021 |
| CN | 112884164 | | 6/2021 |
| CN | 112906903 | | 6/2021 |
| CN | 113312667 | | 8/2021 |
| WO | WO 2020229684 | | 11/2020 |

OTHER PUBLICATIONS

International Search Report and Written Opinion in Appln. No. PCT/CN2022/093895, mailed on Aug. 17, 2022, 15 pages (with English translation).

Li et al., "Human Behavior Recognition based on Hierarchical Clustering Multi-Task Learning," Process Automation Instrumentation, Oct. 20, 2017, 8 pages (with English Abstract).

He et al., "Research on Enterprise Data sharing based on Federated learning," China Computer & Communication, Apr. 25, 2020, pp. 173-176 (with English Abstract).

* cited by examiner

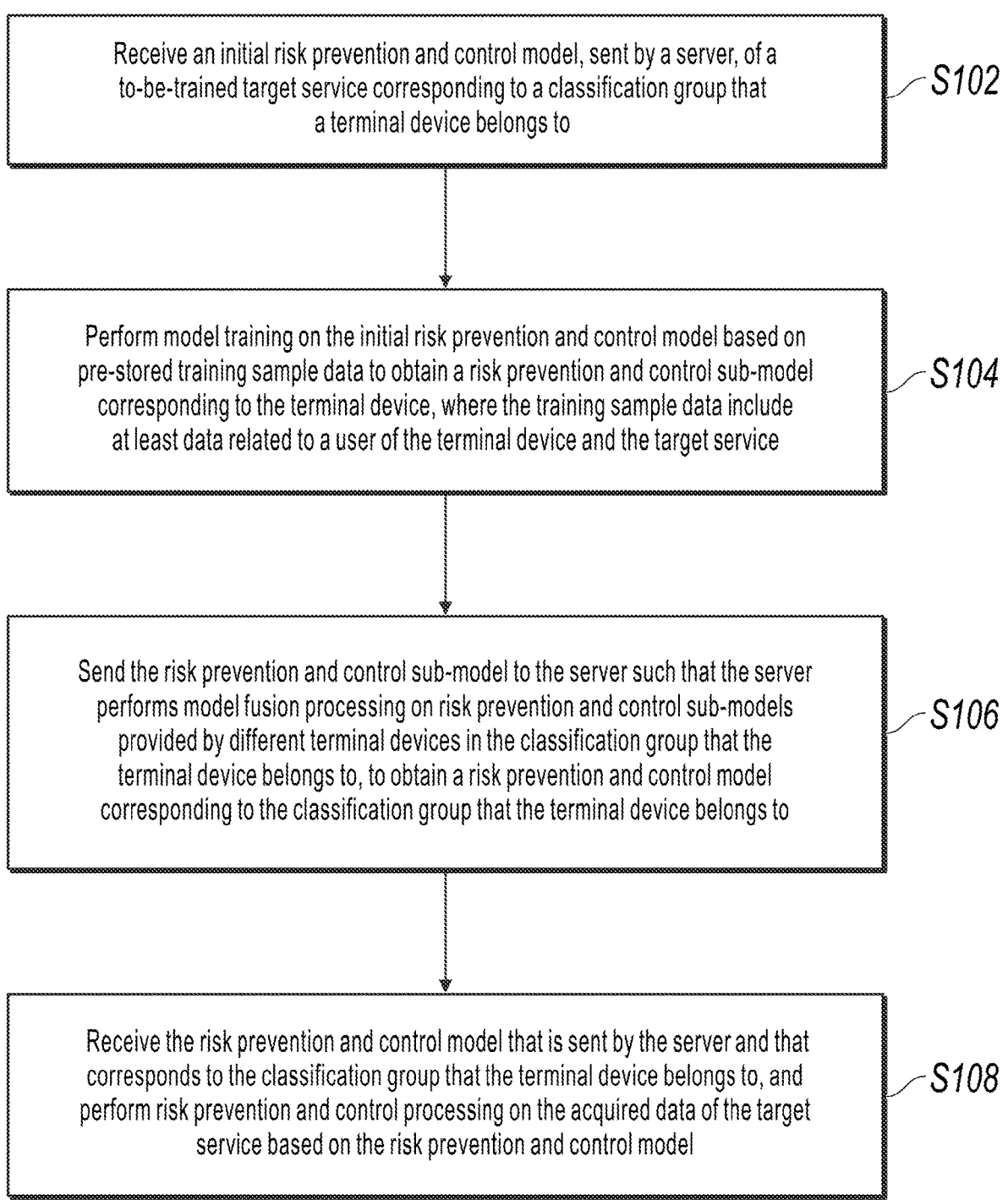

Receive an initial risk prevention and control model, sent by a server, of a to-be-trained target service corresponding to a classification group that a terminal device belongs to — S102

Perform model training on the initial risk prevention and control model based on pre-stored training sample data to obtain a risk prevention and control sub-model corresponding to the terminal device, where the training sample data include at least data related to a user of the terminal device and the target service — S104

Send the risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to — S106

Receive the risk prevention and control model that is sent by the server and that corresponds to the classification group that the terminal device belongs to, and perform risk prevention and control processing on the acquired data of the target service based on the risk prevention and control model — S108

FIG. 1A

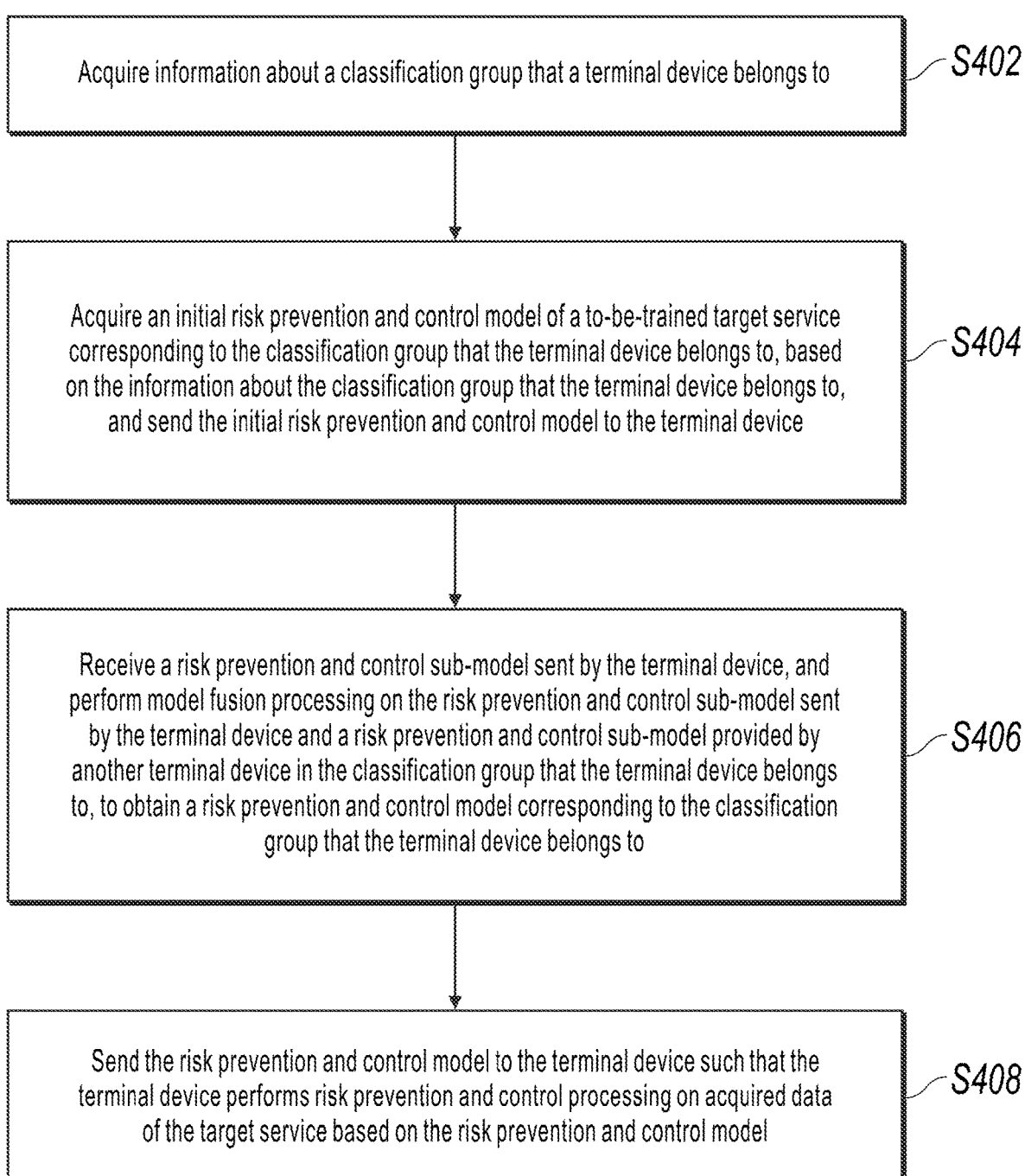

Acquire information about a classification group that a terminal device belongs to    S402

Acquire an initial risk prevention and control model of a to-be-trained target service corresponding to the classification group that the terminal device belongs to, based on the information about the classification group that the terminal device belongs to, and send the initial risk prevention and control model to the terminal device    S404

Receive a risk prevention and control sub-model sent by the terminal device, and perform model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to    S406

Send the risk prevention and control model to the terminal device such that the terminal device performs risk prevention and control processing on acquired data of the target service based on the risk prevention and control model    S408

FIG. 4A

RISK PREVENTION AND CONTROL METHODS, APPARATUSES, AND DEVICES

CROSS-REFERENCE TO RELATED APPLICATIONS

This application is a continuation of PCT Application No. PCT/CN2022/093895, filed on May 19, 2022, which claims priority to Chinese Patent Application No. 202110631595.0, filed on Jun. 7, 2021, and each application is hereby incorporated by reference in its entirety.

TECHNICAL FIELD

This specification relates to the field of computer technologies, and in particular, to risk prevention and control methods, apparatuses, and devices.

BACKGROUND

In an architecture of a current risk prevention and control system, a server usually makes a risk decision, and a terminal device collects data of a corresponding service, and uploads the data to the server. Based on a powerful computing capability, the server analyzes a risk control policy and a risk prevention and control model for the above-mentioned data, and finally outputs a risk control decision.

In the above-mentioned method for making a risk decision by the server, the terminal device needs to upload the data to the server, which may pose a security threat to privacy data of a user. In addition, if the terminal device performs a centralized request, resource consumption of the server is high. Moreover, different users use the same risk prevention and control model, and habits and preferences of different users are different. Therefore, the risk prevention and control model hardly satisfies needs of different users, and flexibility of the risk prevention and control model is poor. Based on the above-mentioned description, there is a need to provide a personalized risk prevention and control system that is based on shared learning between a terminal device and a server (or an edge cloud). The risk prevention and control system can not only protect privacy data, but also reduce interaction between the terminal device and the server, thereby reducing computing pressure of the server, and further improving flexibility of a risk prevention and control model.

SUMMARY

An objective of some embodiments of this specification is to provide a personalized risk prevention and control system that is based on shared learning between a terminal device and a server (or an edge cloud). The risk prevention and control system can not only protect privacy data, but also reduce interaction between the terminal device and the server, thereby reducing computing pressure of the server, and further improving flexibility of a risk prevention and control model.

To implement the above-mentioned technical solutions, some embodiments of this specification provide a risk prevention and control method, applied to a terminal device, where the method includes: receiving an initial risk prevention and control model, sent by a server, of a to-be-trained target service corresponding to a classification group that the terminal device belongs to; performing model training on the initial risk prevention and control model based on pre-stored training sample data to obtain a risk prevention and control sub-model corresponding to the terminal device, where the training sample data include at least data related to a user of the terminal device and the target service; sending the risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to; and receiving the risk prevention and control model that is sent by the server and that corresponds to the classification group that the terminal device belongs to, and performing risk prevention and control processing on the acquired data of the target service based on the risk prevention and control model.

Some embodiments of this specification provide a risk prevention and control method, applied to a server, including: acquiring information about a classification group that a terminal device belongs to; acquiring an initial risk prevention and control model of a to-be-trained target service corresponding to the classification group that the terminal device belongs to, based on the information about the classification group that the terminal device belongs to, and sending the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; receiving the risk prevention and control sub-model sent by the terminal device, and performing model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and sending the risk prevention and control model to the terminal device such that the terminal device performs risk prevention and control processing on the acquired data of the target service based on the risk prevention and control model.

Some embodiments of this specification provide a risk prevention and control apparatus, including: an initial model receiving module, configured to receive an initial risk prevention and control model, sent by a server, of a to-be-trained target service corresponding to a classification group that the apparatus belongs to; a sub-model training module, configured to perform model training on the initial risk prevention and control model based on pre-stored training sample data to obtain a risk prevention and control sub-model corresponding to the apparatus, where the training sample data include at least data related to a user of the apparatus and the target service; a sub-model sending module, configured to send the risk prevention and control sub-model to the server such that the server performs model fusion processing on risk prevention and control sub-models provided by different terminal devices in the classification group that the apparatus belongs to, to obtain a risk prevention and control model corresponding to the classification group that the apparatus belongs to; and a risk prevention and control module, configured to receive the risk prevention and control model that is sent by the server and that corresponds to the classification group that the apparatus belongs to, and perform risk prevention and control processing on the acquired data of the target service based on the risk prevention and control model.

Some embodiments of this specification provide a risk prevention and control apparatus, including: a group information acquisition module, configured to acquire information about a classification group that a terminal device belongs to; an initial model sending module, configured to acquire an initial risk prevention and control model of a to-be-trained target service corresponding to the classification group that the terminal device belongs to, based on the information about the classification group that the terminal device belongs to, and send the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; a sub-model receiving module, configured to receive the risk prevention and control sub-model sent by the terminal device, and perform model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and a risk control model sending module, configured to send the risk prevention and control model to the terminal device such that the terminal device performs risk prevention and control processing on the acquired data of the target service based on the risk prevention and control model.

Some embodiments of this specification provide a risk prevention and control device, including a processor and a memory configured to store a computer-executable instruction, where when being executed, the executable instruction enables the processor to perform the following operations: receiving an initial risk prevention and control model, sent by a server, of a to-be-trained target service corresponding to a classification group that the device belongs to; performing model training on the initial risk prevention and control model based on pre-stored training sample data to obtain a risk prevention and control sub-model corresponding to the device, where the training sample data include at least data related to a user of the device and the target service; sending the risk prevention and control sub-model to the server such that the server performs model fusion processing on risk prevention and control sub-models provided by different terminal devices in the classification group that the device belongs to, to obtain a risk prevention and control model corresponding to the classification group that the device belongs to; and receiving the risk prevention and control model that is sent by the server and that corresponds to the classification group that the device belongs to, and performing risk prevention and control processing on the acquired data of the target service based on the risk prevention and control model.

Some embodiments of this specification provide a risk prevention and control device, including a processor and a memory configured to store a computer-executable instruction, where when being executed, the executable instruction enables the processor to perform the following operations: acquiring information about a classification group that a terminal device belongs to; acquiring an initial risk prevention and control model of a to-be-trained target service corresponding to the classification group that the terminal device belongs to, based on the information about the classification group that the terminal device belongs to, and sending the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; receiving the risk prevention and control sub-model sent by the terminal device, and performing model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and sending the risk prevention and control model to the terminal device such that the terminal device performs risk prevention and control processing on the acquired data of the target service based on the risk prevention and control model.

Some embodiments of this specification further provide a storage medium, where the storage medium is configured to store a computer-executable instruction, and the executable instruction is executed to implement the following procedure: receiving an initial risk prevention and control model, sent by a server, of a to-be-trained target service corresponding to a classification group that a terminal device belongs to; performing model training on the initial risk prevention and control model based on pre-stored training sample data to obtain a risk prevention and control sub-model corresponding to the terminal device, where the training sample data include at least data related to a user of the terminal device and the target service; sending the risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to; and receiving the risk prevention and control model that is sent by the server and that corresponds to the classification group that the terminal device belongs to, and performing risk prevention and control processing on the acquired data of the target service based on the risk prevention and control model.

Some embodiments of this specification further provide a storage medium, where the storage medium is configured to store a computer-executable instruction, and the executable instruction is executed to implement the following procedure: acquiring information about a classification group that a terminal device belongs to; acquiring an initial risk prevention and control model of a to-be-trained target service corresponding to the classification group that the terminal device belongs to, based on the information about the classification group that the terminal device belongs to, and sending the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; receiving the risk prevention and control sub-model sent by the terminal device, and performing model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and sending the risk prevention and control model to the terminal device such that the terminal device performs risk prevention and control processing on the acquired data of the target service based on the risk prevention and control model.

BRIEF DESCRIPTION OF DRAWINGS

FIG. 1A shows some embodiments of a risk prevention and control method, according to this specification;

FIG. 4A shows some embodiments of another risk prevention and control method, according to this specification;

DESCRIPTION OF EMBODIMENTS

To make a person skilled in the art better understand the technical solutions in this specification, the following clearly and comprehensively describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on some embodiments of this specification without creative efforts shall fall within the protection scope of this specification.

Embodiment 1

Figure 1B:
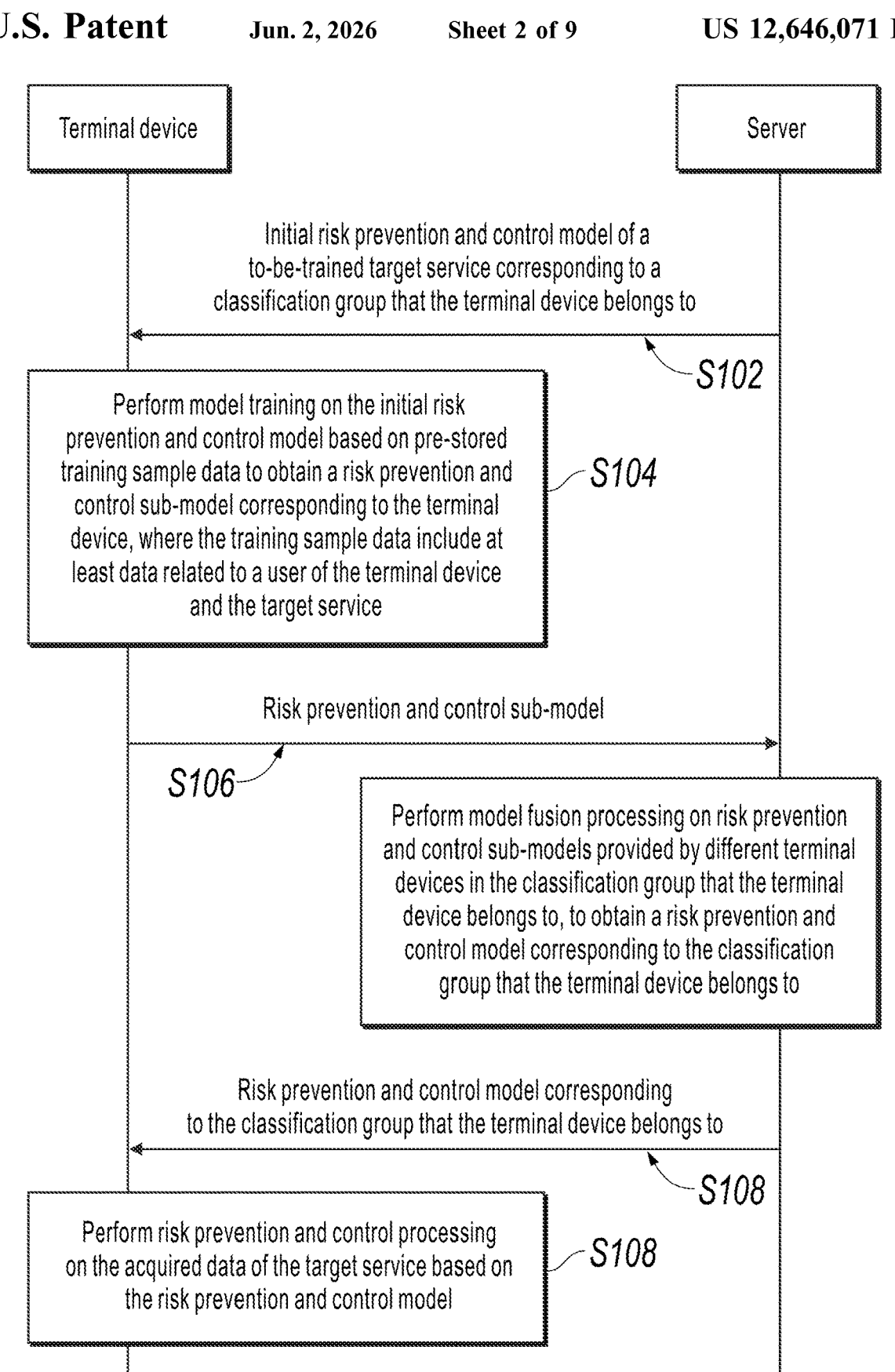
FIG. 1B is a schematic diagram illustrating a processing procedure of risk prevention and control, according to this specification.

As shown in FIG. 1A and FIG. 1B, some embodiments of this specification provide a risk prevention and control method. The method can be performed by a terminal device, and the terminal device can be, for example, a mobile phone, a tablet computer, a personal computer, etc. The method can specifically include the following steps: Step S102: Receive an initial risk prevention and control model, sent by a server, of a to-be-trained target service corresponding to a classification group that the terminal device belongs to.

The server can be a server of a specific service (such as a transaction service or a financial service). Specifically, for example, the server can be a server of a payment service, or can be a server of a service related to finance or instant messaging, or can be a server that performs risk prevention and control on a specific service. Details can be set based on an actual situation, which is not limited in some embodiments of this specification. The classification group can be a classification group obtained after group division is performed on the terminal device through clustering or the like. The classification group can be set by using a plurality of different methods. For example, classification group division can be performed by using different specified age brackets, or classification group division can be performed by using different areas in which the user is located, or classification group division can be performed based on duration of registering a target service by the user. Details can be set based on an actual situation, which is not limited in some embodiments of this specification. The target service can be any service that may pose a risk or that needs risk prevention and control, such as a payment service or a transfer service. Details can be set based on an actual situation, which is not limited in some embodiments of this specification. The initial risk prevention and control model can be an untrained model that is used to perform risk prevention and control on a specific service. The initial risk prevention and control model can have only a model architecture, and a model parameter in the model is still not accurate. Specifically, for example, the model parameter can still be unknown, or can be a predetermined value or a random value. Details can be set based on an actual situation, which is not limited in some embodiments of this specification.

Figure 2:
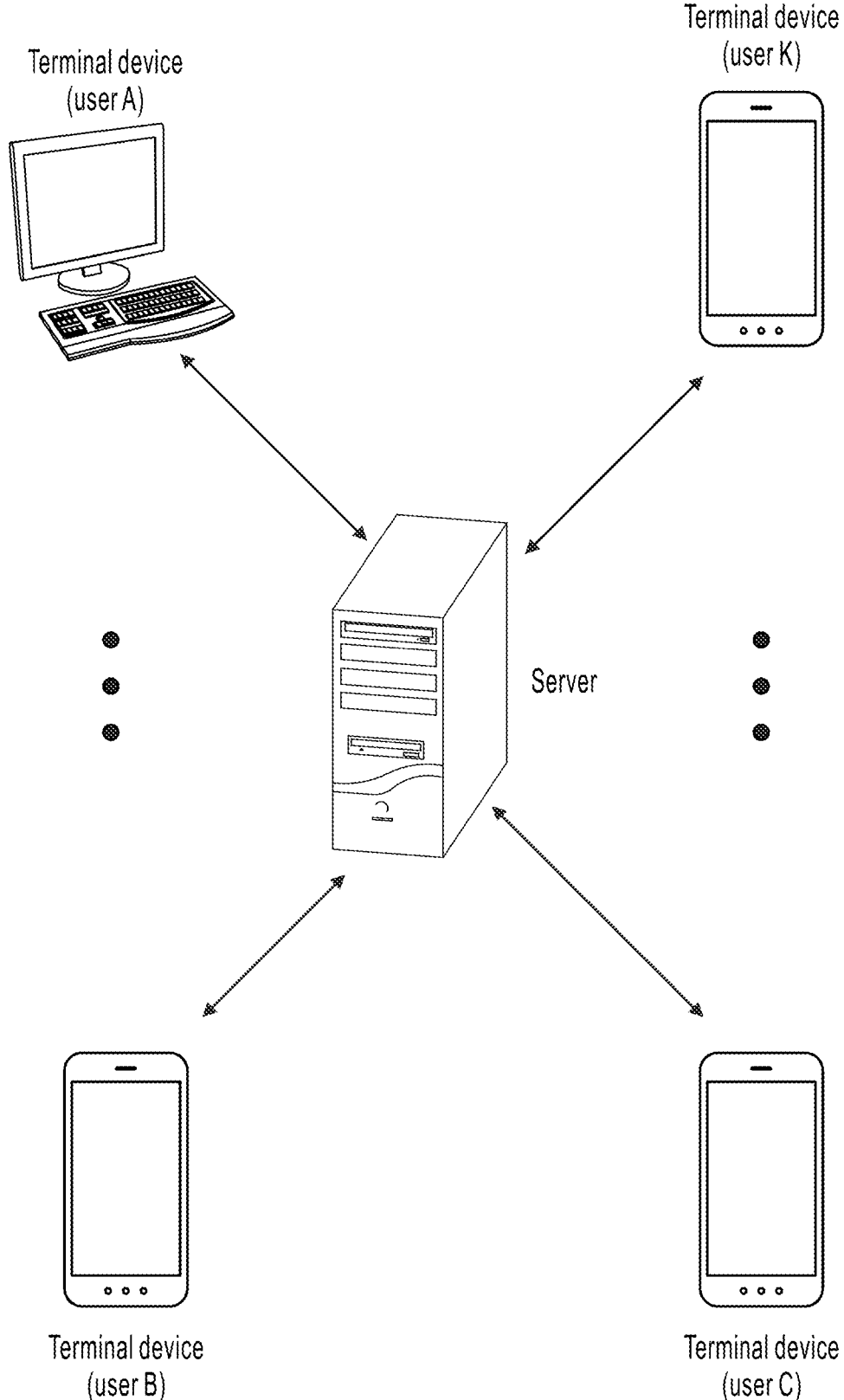
FIG. 2 is a schematic structural diagram illustrating a risk prevention and control system, according to this specification.

During implementation, in an architecture of a current risk prevention and control system, a server usually makes a risk decision, and a terminal device collects data of a corresponding service, and uploads the data to the server. Based on a powerful computing capability, the server analyzes a risk control policy and a risk prevention and control model for the above-mentioned data, and finally outputs a risk control decision. In the above-mentioned method for making a risk decision by the server, the terminal device needs to upload the data to the server, which may pose a security threat to privacy data of a user. In addition, if the terminal device performs a centralized request, resource consumption of the server is high. Moreover, different users use the same risk prevention and control model, and habits and preferences of different users are different. Therefore, the risk prevention and control model hardly satisfies needs of different users, and flexibility of the risk prevention and control model is poor. Based on the above-mentioned description, there is a need to provide a personalized risk prevention and control system that is based on shared learning between a terminal device and a server (or an edge cloud). The risk prevention and control system can not only protect privacy data, but also reduce interaction between the terminal device and the server, thereby reducing computing pressure of the server, and further improving flexibility of a risk prevention and control model. Some embodiments of this specification provide an implementable technical solution, which can specifically include the following content: As shown in FIG. 2, considering habits and preferences of different users and degrees of risk prevention and control awareness, different users can be clustered, classified, or manually allocated to groups such that users with a same attribute can be classified into the same classification group, and further classification groups that different users belong to can be determined. Correspondingly, classification groups that terminal devices used by users belong to can also be determined. The server can respectively construct model architectures of corresponding risk prevention and control models for different classification groups. The model architectures of the risk prevention and control models corresponding to different classification groups can be the same or can be different. A parameter value of a model parameter in the model architecture can be unknown, can be randomly set, or can be set based on expert experience. Details can be set based on an actual situation, which is not limited in some embodiments of this specification. The above-mentioned risk prevention and control models that are set by the server for different classification groups can be used as initial risk prevention and control models of to-be-trained target services. The server can obtain different classification groups and information about terminal devices included in the different classification groups or information about users, and then can send, to each terminal device based on the information about the terminal devices or the information about the users, an initial risk prevention and control model of a to-be-trained target service corresponding to a classification group that the terminal device belongs to. The terminal device can receive the initial risk prevention and control model, sent by the server, corresponding to the classification group that the terminal device belongs to.

For example, for a target service, different age brackets can be predetermined, for example, three age brackets such as 0-25 years, 26-60 years, and over 60 years. Corresponding algorithms can be used to construct model architectures of corresponding risk prevention and control models for the above-mentioned three different age brackets, respectively. Parameter values of model parameters of the risk prevention and control models can be randomly set such that initial risk prevention and control models of target services corresponding to the three different age brackets can be obtained. Then, information about each user that is recorded in advance or that registers a target service in the server, or information about a terminal device used by the user can be acquired. Based on the age information of the user, a classification group that the terminal device of the user belongs to can be determined. Specifically, for example, a user's age is 37, which belongs to the age bracket of 26-60 years. In such case, an initial risk prevention and control model of a target service corresponding to the age bracket of 26-60 years can be acquired, and the initial risk prevention and control model can be sent to the terminal device of the user.

The processing in step S102 can be triggered using a plurality of different methods. For example, the processing can be triggered when the terminal device requests to execute the target service from the server. Alternatively, each time a predetermined period expires, the server can send, to the terminal device, the initial risk prevention and control model corresponding to the classification group that the terminal device belongs to. Alternatively, the terminal device can periodically acquire from the server, the initial risk prevention and control model corresponding to the classification group that the terminal device belongs to, and so on. Details can be set based on an actual situation, which is not limited in some embodiments of this specification.

Step S104: Perform model training on the initial risk prevention and control model based on pre-stored training sample data to obtain a risk prevention and control sub-model corresponding to the terminal device, where the training sample data include at least data related to a user of the terminal device and the target service.

The training sample data can include related data generated by the user of the terminal device in a process of executing the target service, that is, data related to the user of the terminal device and the target service. The related data can be data generated in a specified time period, or can be data generated from a time at which the user registers the target service to a current moment. Details can be set based on an actual situation, which is not limited in some embodiments of this specification. In practice, the training sample data can alternatively include data that are related to the target service and that are acquired by the terminal device from another terminal device, a server, a database, or the like by using a specified data acquisition method, or can include data that are related to the user of the terminal device and the target service and that are acquired by the terminal device from another terminal device, a server, a database, or the like by using a specified data acquisition method.

During implementation, since model parameters in the initial risk prevention and control model are not accurate, each terminal device can maintain a specific amount of training sample data. After the initial risk prevention and control model is obtained using the above-mentioned method, model training can be performed on the initial risk prevention and control model by using the training sample data in the terminal device. To be specific, one piece of sample data can be selected from the training sample data, and the sample data are input into the initial risk prevention and control model to obtain an expression about the model parameter. Then, another piece of sample data can be selected from the training sample data, and the sample data are input into the initial risk prevention and control model to obtain another expression about the model parameter. A plurality of expressions about the model parameter can be obtained using the above-mentioned method, and the plurality of expressions about the model parameter can form an equation group, and the equation group can be solved to obtain a parameter value of each model parameter. In the above-mentioned method, the remaining sample data in the training sample data can be used to update the model parameter in the initial risk prevention and control model until a final result is converged so as to obtain a more optimal model parameter. Further, a trained risk prevention and control model can be obtained and used as a risk prevention and control sub-model corresponding to the terminal device.

Step S106: Send the risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to.

During implementation, the terminal device can send the risk prevention and control sub-model to the server, and the server can receive the risk prevention and control sub-model corresponding to the terminal device. Similarly, a plurality of different terminal devices in the classification group that the terminal device belongs to can train, by using the above-mentioned method, the risk prevention and control sub-model belonging to each terminal device. Each terminal device can provide the risk prevention and control sub-model trained by the terminal device to the server, and the server can perform model fusion processing on the risk prevention and control sub-models provided by different terminal devices in the classification group that the terminal device belongs to. As such, the server can obtain, through federated learning, the risk prevention and control model corresponding to the classification group that the terminal device belongs to.

Step S108: Receive the risk prevention and control model that is sent by the server and that corresponds to the classification group that the terminal device belongs to, and perform risk prevention and control processing on the acquired data of the target service based on the risk prevention and control model.

During implementation, the terminal device can receive the risk prevention and control model that is sent by the server and that corresponds to the classification group that the terminal device belongs to. When obtaining the data of the target service, the terminal device can input the data of the target service into the risk prevention and control model to obtain a result indicating whether the data of the target service pose a risk. If the result indicates that the data of the target service pose a risk, the terminal device can be rejected to execute the target service. If the result indicates that the data of the target service pose no risk, the terminal device can be allowed to execute the target service.

According to the risk prevention and control method provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

Embodiment 2

Figure 3:
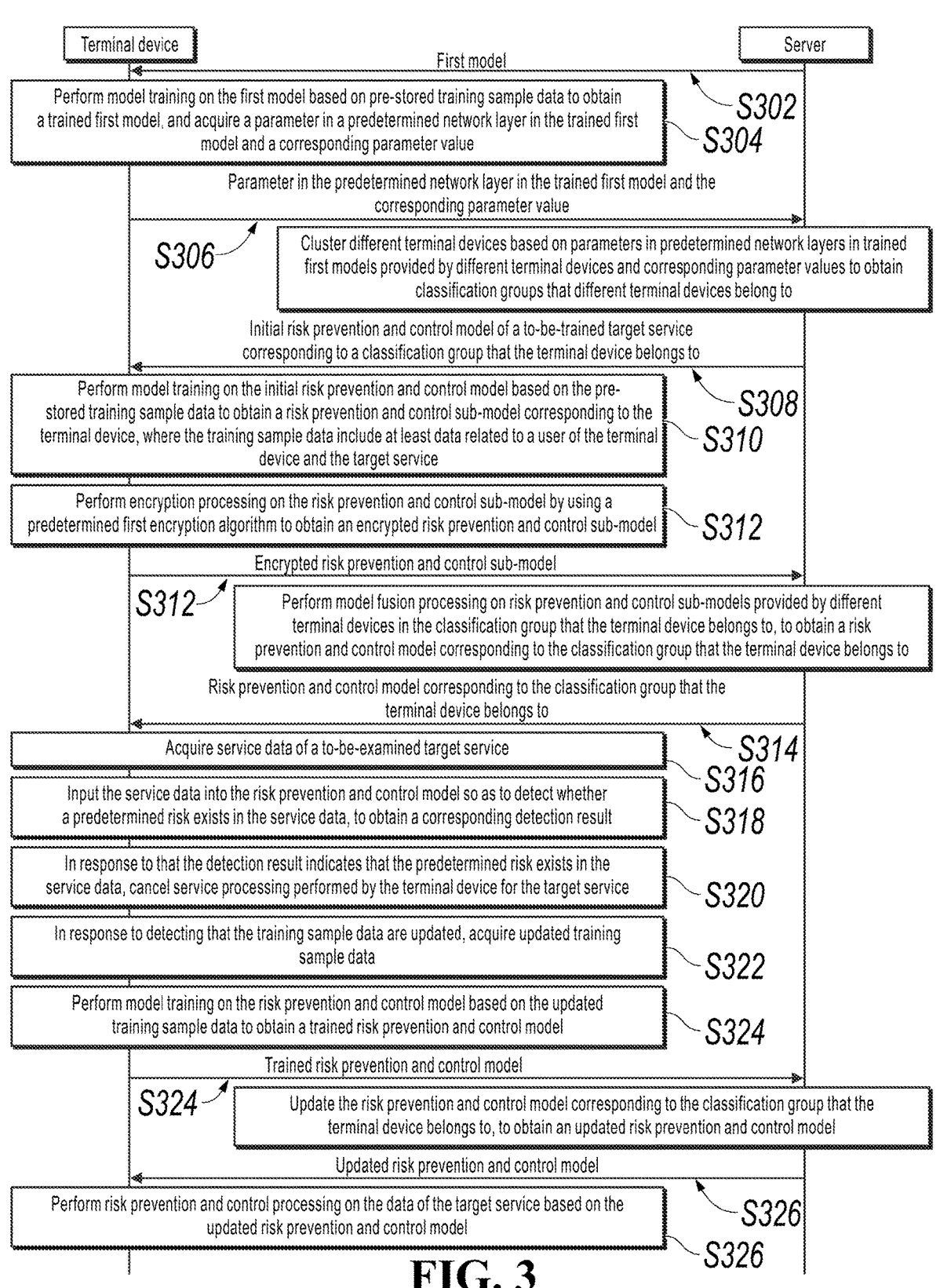
FIG. 3 is a schematic diagram illustrating another processing procedure of risk prevention and control, according to this specification.

As shown in FIG. 3, some embodiments of this specification provide a risk prevention and control method. The method can be performed by a terminal device, and the terminal device can be, for example, a mobile phone, a tablet computer, a personal computer, etc. The method can specifically include the following steps: Step S302: Receive a to-be-trained first model sent by a server, where a parameter value of a model parameter in the first model is a randomly generated parameter value or a predetermined parameter value.

The first model can be constructed by using a predetermined neural network model. The neural network model can include a plurality of types, for example, can include a convolutional neural network model, a recurrent neural network model, and a generative adversarial network model. Details can be set based on an actual situation, which is not limited in some embodiments of this specification. The parameter value of the model parameter in the first model can be a predetermined parameter value. For example, the parameter value of the model parameter in the first model can be a parameter value that is set based on expert experience, or the parameter value of the model parameter in the first model can be a parameter value that is set based on related historical data. Details can be set based on an actual situation, which is not limited in some embodiments of this specification.

During implementation, to improve security of user data, the data related to the target service and the user in the terminal device may not be output, but the corresponding training sample data are retained in the terminal device, and the corresponding model can be trained in the terminal device to obtain the corresponding model parameter. In practice, in a model training process, there is more information about training sample data retained in one or more network layers of a model in a model training process. Therefore, the server can predetermine a corresponding algorithm, construct a model architecture of the first model by using the algorithm, and set a parameter value of a model parameter in the model architecture such that the server can obtain the to-be-trained first model. To accurately perform classification group division for the terminal device or the user of the terminal device, the classification group division can be implemented based on the training sample data in the terminal device. However, since the training sample data cannot be output by the terminal device, information related to the training sample data in the terminal device can be acquired through model training. Specifically, the server can send the constructed to-be-trained first model to the terminal device, and the terminal device can receive the to-be-trained first model sent by the server.

Step S304: Perform model training on the first model based on the pre-stored training sample data to obtain a trained first model, and acquire a parameter in a predetermined network layer in the trained first model and a corresponding parameter value.

The predetermined network layer can include one network layer, or can include a plurality of network layers. Specifically, for example, the first model is a convolutional neural network model, and the predetermined network layer can be a plurality of convolution layers in the convolutional neural network model, or one or more of a convolution layer, a pooling layer, and a full connection layer. Details can be set based on an actual situation. In practice, the predetermined network layer in the trained first model can be a previous network layer (such as a full connection layer) of an output layer.

During implementation, there is more information about training sample data retained in one or more network layers of a model in the model training process. After communication traffic and validity are comprehensively considered, information about one or more network layers of the model in the model training process can be selectively uploaded only to the server. Specifically, training sample data pre-stored in the terminal device can be acquired, and model training can be performed on the first model by using the training sample data to obtain the trained first model. Then, a parameter in the predetermined network layer in the trained first model and a corresponding parameter value can be acquired. For example, a parameter in the previous network layer (specifically, for example, the full connection layer) of the output layer in the trained first model and a corresponding parameter value can be acquired.

Step S306: Send the parameter in the predetermined network layer in the trained first model and the corresponding parameter value to the server such that the server clusters different terminal devices based on parameters in predetermined network layers in trained first models provided by different terminal devices and corresponding parameter values to obtain classification groups that different terminal devices belong to.

During implementation, the server receives the parameter in the predetermined network layer in the trained first model and the corresponding parameter value that are sent by the terminal device. Since the parameter in the predetermined network layer in the trained first model and the corresponding parameter value retain the information about the training sample data in the terminal device, the server can replace the training sample data in the terminal device with the parameter in the predetermined network layer in the trained first model and the corresponding parameter value to perform classification group division for the terminal device or the user of the terminal device. In addition, other terminal devices can also provide parameters in the predetermined network layers in the trained first models and corresponding parameter values to the server by using the above-mentioned method such that the server can obtain the parameters in the predetermined network layers in the trained first models and the corresponding parameter values that are provided by the plurality of terminal devices. Then, the server can perform clustering processing, by using a predetermined clustering algorithm, on the parameters in the predetermined network layers in the trained first models and the corresponding parameter values that are acquired, to obtain classification groups that different terminal devices belong to. As such, the classification group that the above-mentioned terminal device belongs to can be obtained.

In practice, the above-mentioned processing in step S306 can be diverse. The following provides an optional processing method, which can specifically include the following content: performing encryption processing on the parameter in the predetermined network layer in the trained first model and the corresponding parameter value by using a predetermined second encryption algorithm to obtain an encrypted parameter and a corresponding encrypted parameter value, and sending the encrypted parameter and the corresponding encrypted parameter value to the server.

The second encryption algorithm can include a plurality of types, such as a homomorphic encryption algorithm, a partially homomorphic encryption algorithm, or a fully homomorphic encryption algorithm. Details can be set based on an actual situation, which is not limited in some embodiments of this specification.

During implementation, to ensure security of data transmission, an encryption algorithm (that is, the second encryption algorithm) can be predetermined. The second encryption algorithm can be used to perform encryption processing on the parameter in the predetermined network layer in the trained first model and the corresponding parameter value to obtain an encrypted parameter and a corresponding encrypted parameter value, and then the encrypted parameter and the corresponding encrypted parameter value are sent to the server so as to ensure security of data in a data transmission process.

Step S308: Receive an initial risk prevention and control model, sent by a server, of a to-be-trained target service corresponding to a classification group that a terminal device belongs to.

The initial risk prevention and control model can be constructed by using a predetermined neural network model. The neural network model can include a plurality of types, for example, can include a convolutional neural network model, a recurrent neural network model, and a generative adversarial network model. The above-mentioned first model can be different from the initial risk prevention and control model. The classification group that the terminal device belongs to is obtained by the server by clustering different terminal devices by using a predetermined clustering algorithm based on the parameters in the predetermined network layers in the trained first models provided by different terminal devices and the corresponding parameter values. For details, references can be made to the above-mentioned related content. The clustering algorithm can be a K-means clustering algorithm or the like. In practice, the clustering algorithm can also include a plurality of other different clustering algorithms. Details can be set based on an actual situation, which is not limited in some embodiments of this specification.

Step S310: Perform model training on the initial risk prevention and control model based on the above-mentioned training sample data to obtain a risk prevention and control sub-model corresponding to the terminal device, where the training sample data include at least data related to a user of the terminal device and the target service.

Step S312: Perform encryption processing on the risk prevention and control sub-model by using a predetermined first encryption algorithm to obtain an encrypted risk prevention and control sub-model, and send the encrypted risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to.

The first encryption algorithm can include a plurality of types, such as a homomorphic encryption algorithm, a partially homomorphic encryption algorithm, or a fully homomorphic encryption algorithm. The first encryption algorithm can be the same as or different from the above-mentioned second encryption algorithm. Details can be set based on an actual situation, which is not limited in some embodiments of this specification.

Step S314: Receive a risk prevention and control model that is sent by a server and that corresponds to a classification group that a terminal device belongs to.

The risk prevention and control model corresponding to the classification group that the terminal device belongs to is obtained through the above-mentioned processing. The terminal device can use the risk prevention and control model to perform risk detection and risk prevention and control on the service data of the target service, which can specifically include the following processing in step S316 to step S320.

Step S316: Acquire service data of the to-be-examined target service.

Step S318: Input the service data into the risk prevention and control model so as to detect whether a predetermined risk exists in the service data, to obtain a corresponding detection result.

Step S320: In response to that the detection result indicates that the predetermined risk exists in the service data, cancel service processing performed by the terminal device for the target service.

In addition, the risk prevention and control model corresponding to the classification group that the terminal device belongs to can be further updated, which can specifically include the following processing in step S322 to step S326.

Step S322: In response to detecting that the training sample data are updated, acquire updated training sample data.

During implementation, the method for detecting whether the training sample data stored in the terminal device are updated can include a plurality of types. For example, the training sample data stored in the terminal device can include a data identifier. The terminal device can periodically or aperiodically detect whether the data identifier in the training sample data is increased so as to determine whether the training sample data are updated, or can detect whether an increased data volume in the training sample data exceeds a predetermined quantity threshold so as to determine whether the training sample data are updated, and so on. Details can be set based on an actual situation, which is not limited in some embodiments of this specification.

Step S324: Perform model training on the risk prevention and control model based on the updated training sample data to obtain a trained risk prevention and control model, and send the trained risk prevention and control model to the server such that the server updates the risk prevention and control model corresponding to the classification group that the terminal device belongs to, to obtain an updated risk prevention and control model.

During implementation, the terminal device can send the trained risk prevention and control model to the server, and the server can receive the trained risk prevention and control model. Similarly, a plurality of different terminal devices in the classification group that the terminal device belongs to can train, by using the above-mentioned method, the risk prevention and control model belonging to each terminal device. Each terminal device can provide the risk prevention and control model trained by the terminal device to the server, and the server can perform model fusion processing on the risk prevention and control models provided by different terminal devices in the classification group that the terminal device belongs to, so as to update the risk prevention and control model corresponding to the classification group that the terminal device belongs to. As such, the server can continuously update, through federated learning, the risk prevention and control model corresponding to the classification group that the terminal device belongs to. In addition, the server can alternatively update, only by using the risk prevention and control model provided by the terminal device, the risk prevention and control model corresponding to the classification group that the terminal device belongs to. Details can be set based on an actual situation, which is not limited in some embodiments of this specification.

Step S326: Receive the updated risk prevention and control model sent by the server, and perform risk prevention and control processing on the data of the target service based on the updated risk prevention and control model.

In addition to the above-mentioned implementation in step S322 to step S326, the above-mentioned processing for updating the risk prevention and control model corresponding to the classification group that the terminal device belongs to can be further implemented using the following method, which can specifically include the following processing in step A2 and step A4.

Step A2: In response to detecting that the training sample data are updated, acquire updated training sample data.

Step A4: Perform model training on the risk prevention and control model based on the updated training sample data to obtain a trained risk prevention and control model, and perform risk prevention and control processing on the data of the target service based on the trained risk prevention and control model.

According to the risk prevention and control method provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Embodiment 3

Figure 4B:
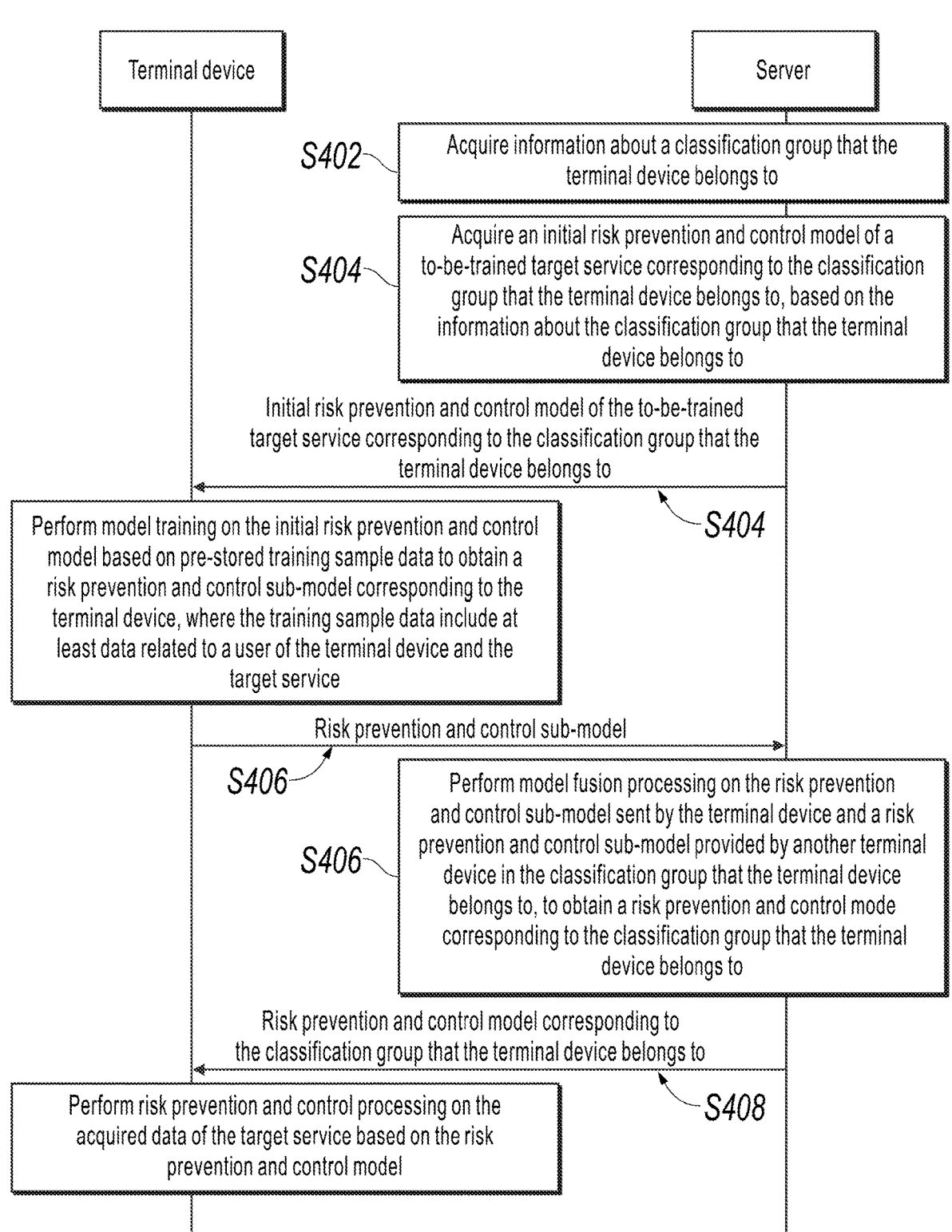
FIG. 4B is a schematic diagram illustrating still another processing procedure of risk prevention and control, according to this specification.

As shown in FIG. 4A and FIG. 4B, some embodiments of this specification provide a risk prevention and control method. The method can be performed by a server, for example, a server of a specific service (such as a transaction service or a financial service). Specifically, the server can be a payment service server, can be a server of a payment service, or can be a server of a service related to finance or instant messaging, or can be a server that needs to perform risk detection or risk prevention and control on service data. The method can specifically include the following steps: Step S402: Acquire information about a classification group that a terminal device belongs to.

During implementation, the classification group that the terminal device belongs to can be determined using a plurality of different methods. For example, the classification group can be obtained by performing group division for the terminal device through clustering or the like, or the classification group that the terminal device belongs to can be obtained by manually performing classification group division for a user of each terminal device.

The processing in step S402 can be triggered using a plurality of different methods. For example, the processing can be triggered when the terminal device requests to execute the target service from the server. Alternatively, each time a predetermined period expires, the server can acquire information about the classification group that the terminal device belongs to, and so on. Details can be set based on an actual situation, which is not limited in some embodiments of this specification.

Step S404: Acquire an initial risk prevention and control model of a to-be-trained target service corresponding to the classification group that the terminal device belongs to, based on the information about the classification group that the terminal device belongs to, and send the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service.

Step S406: Receive the risk prevention and control sub-model sent by the terminal device, and perform model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device.

Step S408: Send the risk prevention and control model to the terminal device such that the terminal device performs risk prevention and control processing on the acquired data of the target service based on the risk prevention and control model.

According to the risk prevention and control method provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

Embodiment 4

Figure 5:
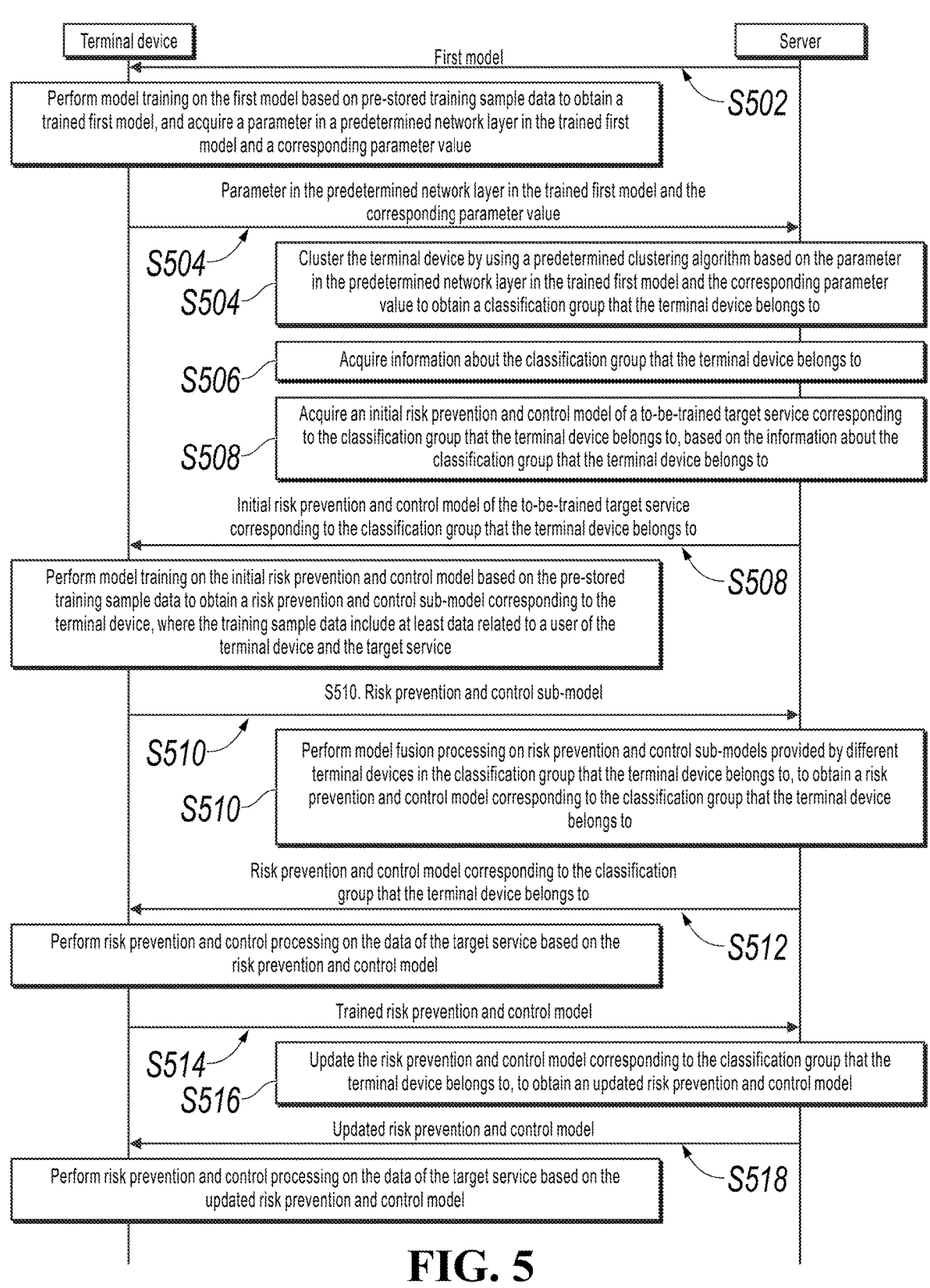
FIG. 5 is a schematic diagram illustrating still another processing procedure of risk prevention and control, according to this specification.

As shown in FIG. 5, some embodiments of this specification provide a risk prevention and control method. The method can be performed by a server. The server can be a server of a specific service (such as a transaction service or a financial service). Specifically, for example, the server can be a server of a payment service, or can be a server of a service related to finance or instant messaging, or can be a server that needs to perform risk detection or risk prevention and control on service data. The method can specifically include the following steps: Step S502: Send a to-be-trained first model to the terminal device, where a parameter value of a model parameter in the first model is a randomly generated parameter value or a predetermined parameter value such that the terminal device performs model training on the first model based on the pre-stored training sample data to obtain a trained first model, and sends a parameter in a predetermined network layer in the trained first model and a corresponding parameter value to the server.

The first model can be constructed by using a predetermined neural network model.

Step S504: Receive the parameter in the predetermined network layer in the trained first model and the corresponding parameter value that are sent by the terminal device, and cluster the terminal device by using a predetermined clustering algorithm based on the parameter in the predetermined network layer in the trained first model and the corresponding parameter value to obtain the classification group that the terminal device belongs to.

The clustering algorithm can include a K-means clustering algorithm, etc.

The parameter in the predetermined network layer in the trained first model and the corresponding parameter value can be an encrypted parameter and a corresponding encrypted parameter value that are obtained after the terminal device performs encryption processing by using the predetermined second encryption algorithm. Based on the above-mentioned description, after receiving the parameter in the predetermined network layer in the trained first model and the corresponding parameter value that are sent by the terminal device, the server can perform decryption processing on the encrypted parameter and the corresponding encrypted parameter value by using a decryption algorithm corresponding to the second encryption algorithm to obtain the parameter in the predetermined network layer in the trained first model and the corresponding parameter value.

Step S506: Acquire information about a classification group that a terminal device belongs to.

Step S508: Acquire an initial risk prevention and control model of a to-be-trained target service corresponding to the classification group that the terminal device belongs to, based on the information about the classification group that the terminal device belongs to, and send the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service.

The initial risk prevention and control model can be constructed by using a predetermined neural network model. The initial risk prevention and control model can be different from the above-mentioned first model.

Step S510: Receive the risk prevention and control sub-model sent by the terminal device, and perform model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device.

The risk prevention and control sub-model can be an encrypted risk prevention and control sub-model obtained after the terminal device performs encryption processing by using the predetermined first encryption algorithm. Based on the above-mentioned description, after receiving the risk prevention and control sub-model sent by the terminal device, the server can perform decryption processing on the encrypted risk prevention and control sub-model by using the decryption algorithm corresponding to the first encryption algorithm to obtain the risk prevention and control sub-model.

Step S512: Send the risk prevention and control model to the terminal device such that the terminal device performs risk prevention and control processing on the acquired data of the target service based on the risk prevention and control model.

Step S514: Receive the trained risk prevention and control model sent by the terminal device, where the trained risk prevention and control model is obtained by the terminal device, when detecting that the training sample data are updated, by performing model training on the risk prevention and control model based on the updated training sample data.

Step S516: Update the risk prevention and control model corresponding to the classification group that the terminal device belongs to, based on the trained risk prevention and control model, to obtain an updated risk prevention and control model.

Step S518: Send the updated risk prevention and control model to the terminal device such that the terminal device performs risk prevention and control processing on the data of the target service based on the updated risk prevention and control model.

According to the risk prevention and control method provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Embodiment 5

Figure 6:
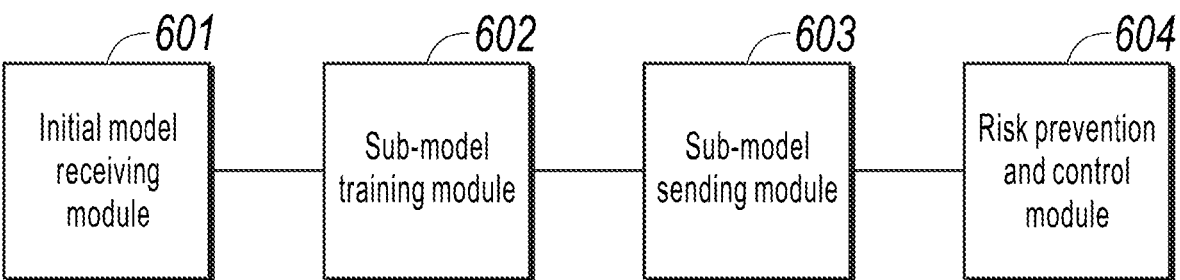
FIG. 6 shows some embodiments of a risk prevention and control apparatus, according to this specification.

The risk prevention and control method provided in some embodiments of this specification has been described above. Based on the same idea, some embodiments of this specification further provide a risk prevention and control apparatus, as shown in FIG. 6.

The risk prevention and control apparatus includes an initial model receiving module 601, a sub-model training module 602, a sub-model sending module 603, and a risk prevention and control module 604. The initial model receiving module 601 is configured to receive an initial risk prevention and control model, sent by a server, of a to-be-trained target service corresponding to a classification group that the apparatus belongs to. The sub-model training module 602 is configured to perform model training on the initial risk prevention and control model based on pre-stored training sample data to obtain a risk prevention and control sub-model corresponding to the apparatus, where the training sample data include at least data related to a user of the apparatus and the target service. The sub-model sending module 603 is configured to send the risk prevention and control sub-model to the server such that the server performs model fusion processing on risk prevention and control sub-models provided by different terminal devices in the classification group that the apparatus belongs to, to obtain a risk prevention and control model corresponding to the classification group that the apparatus belongs to. The risk prevention and control module 604 is configured to receive the risk prevention and control model that is sent by the server and that corresponds to the classification group that the apparatus belongs to, and perform risk prevention and control processing on the acquired data of the target service based on the risk prevention and control model.

In some embodiments of this specification, the initial risk prevention and control model is constructed by using a predetermined neural network model.

In some embodiments of this specification, the sub-model sending module 603 is configured to perform encryption processing on the risk prevention and control sub-model by using a predetermined first encryption algorithm to obtain an encrypted risk prevention and control sub-model, and send the encrypted risk prevention and control sub-model to the server.

In some embodiments of this specification, the apparatus further includes: a first model receiving module, configured to receive a to-be-trained first model sent by the server, where a parameter value of a model parameter in the first model is a randomly generated parameter value or a predetermined parameter value; a first model training module, configured to perform model training on the first model based on the training sample data to obtain a trained first model, and acquire a parameter in a predetermined network layer in the trained first model and a corresponding parameter value; and a parameter sending module, configured to send the parameter in the predetermined network layer in the trained first model and the corresponding parameter value to the server such that the server clusters different terminal devices based on parameters in predetermined network layers in trained first models provided by different terminal devices and corresponding parameter values to obtain classification groups that different terminal devices belong to.

In some embodiments of this specification, the first model is constructed by using a predetermined neural network model, and the first model is different from the initial risk prevention and control model.

In some embodiments of this specification, the classification group that the apparatus belongs to is obtained by the server by clustering different terminal devices by using a predetermined clustering algorithm based on the parameters in the predetermined network layers in the trained first models provided by different terminal devices and the corresponding parameter values.

In some embodiments of this specification, the clustering algorithm is a K-means clustering algorithm.

In some embodiments of this specification, the parameter sending module is configured to perform encryption processing on the parameter in the predetermined network layer in the trained first model and the corresponding parameter value by using a predetermined second encryption algorithm to obtain an encrypted parameter and a corresponding encrypted parameter value, and send the encrypted parameter and the corresponding encrypted parameter value to the server.

In some embodiments of this specification, the risk prevention and control module 604 includes: a data acquisition unit, configured to acquire service data of the to-be-examined target service; a risk prevention and control unit, configured to input the service data into the risk prevention and control model so as to detect whether a predetermined risk exists in the service data, to obtain a corresponding detection result; and a service processing unit, configured to: in response to that the detection result indicates that the predetermined risk exists in the service data, cancel service processing performed by the apparatus for the target service.

In some embodiments of this specification, the apparatus further includes: a first sample update detection module, configured to: in response to detecting that the training sample data are updated, acquire updated training sample data; and a model updating module, configured to perform model training on the risk prevention and control model based on the updated training sample data to obtain a trained risk prevention and control model, and perform risk prevention and control processing on the data of the target service based on the trained risk prevention and control model.

In some embodiments of this specification, the apparatus further includes: a second sample update detection module, configured to: in response to detecting that the training sample data are updated, acquire updated training sample data; an update training module, configured to: perform model training on the risk prevention and control model based on the updated training sample data to obtain a trained risk prevention and control model, and send the trained risk prevention and control model to the server such that the server updates the risk prevention and control model corresponding to the classification group that the apparatus belongs to, to obtain an updated risk prevention and control model; and an updated model receiving module, configured to receive the updated risk prevention and control model sent by the server, and perform risk prevention and control processing on the data of the target service based on the updated risk prevention and control model.

According to the risk prevention and control apparatus provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Embodiment 6

Figure 7:
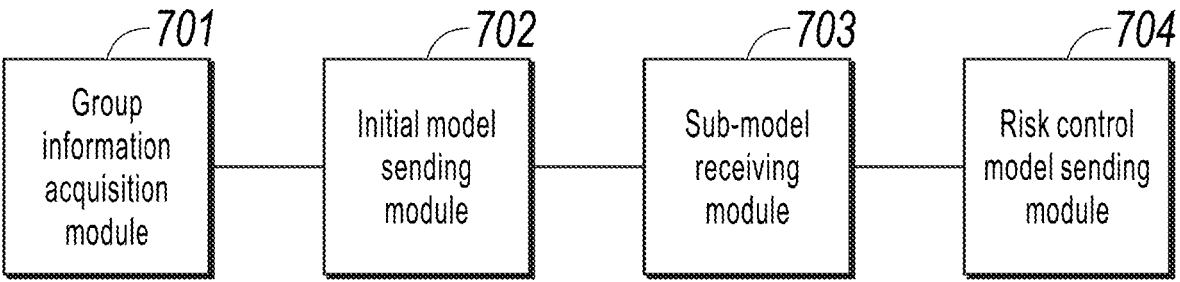
FIG. 7 shows some embodiments of another risk prevention and control apparatus, according to this specification.

Based on the same idea, some embodiments of this specification further provide a risk prevention and control apparatus, as shown in FIG. 7.

The risk prevention and control apparatus includes a group information acquisition module 701, an initial model sending module 702, a sub-model receiving module 703, and a risk control model sending module 704. The group information acquisition module 701 is configured to acquire information about a classification group that a terminal device belongs to. The initial model sending module 702 is configured to acquire an initial risk prevention and control model of a to-be-trained target service corresponding to the classification group that the terminal device belongs to, based on the information about the classification group that the terminal device belongs to, and send the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service. The sub-model receiving module 703 is configured to receive the risk prevention and control sub-model sent by the terminal device, and perform model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device. The risk control model sending module 704 is configured to send the risk prevention and control model to the terminal device such that the terminal device performs risk prevention and control processing on the acquired data of the target service based on the risk prevention and control model.

In some embodiments of this specification, the apparatus further includes: a first model sending module, configured to send a to-be-trained first model to the terminal device, where a parameter value of a model parameter in the first model is a randomly generated parameter value or a predetermined parameter value such that the terminal device performs model training on the first model based on the training sample data to obtain a trained first model, and sends a parameter in a predetermined network layer in the trained first model and a corresponding parameter value to the apparatus; and a parameter receiving module, configured to receive the parameter in the predetermined network layer in the trained first model and the corresponding parameter value that are sent by the terminal device, and cluster the terminal device by using a predetermined clustering algorithm based on the parameter in the predetermined network layer in the trained first model and the corresponding parameter value to obtain the classification group that the terminal device belongs to.

In some embodiments of this specification, the apparatus further includes: an updated model receiving module, configured to receive the trained risk prevention and control model sent by the terminal device, where the trained risk prevention and control model is obtained by the terminal device, when detecting that the training sample data are updated, by performing model training on the risk prevention and control model based on the updated training sample data; an updating module, configured to update the risk prevention and control model corresponding to the classification group that the terminal device belongs to, based on the trained risk prevention and control model, to obtain an updated risk prevention and control model; and an updated model sending module, configured to send the updated risk prevention and control model to the terminal device such that the terminal device performs risk prevention and control processing on the data of the target service based on the updated risk prevention and control model.

According to the risk prevention and control apparatus provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Embodiment 7

Figure 8:
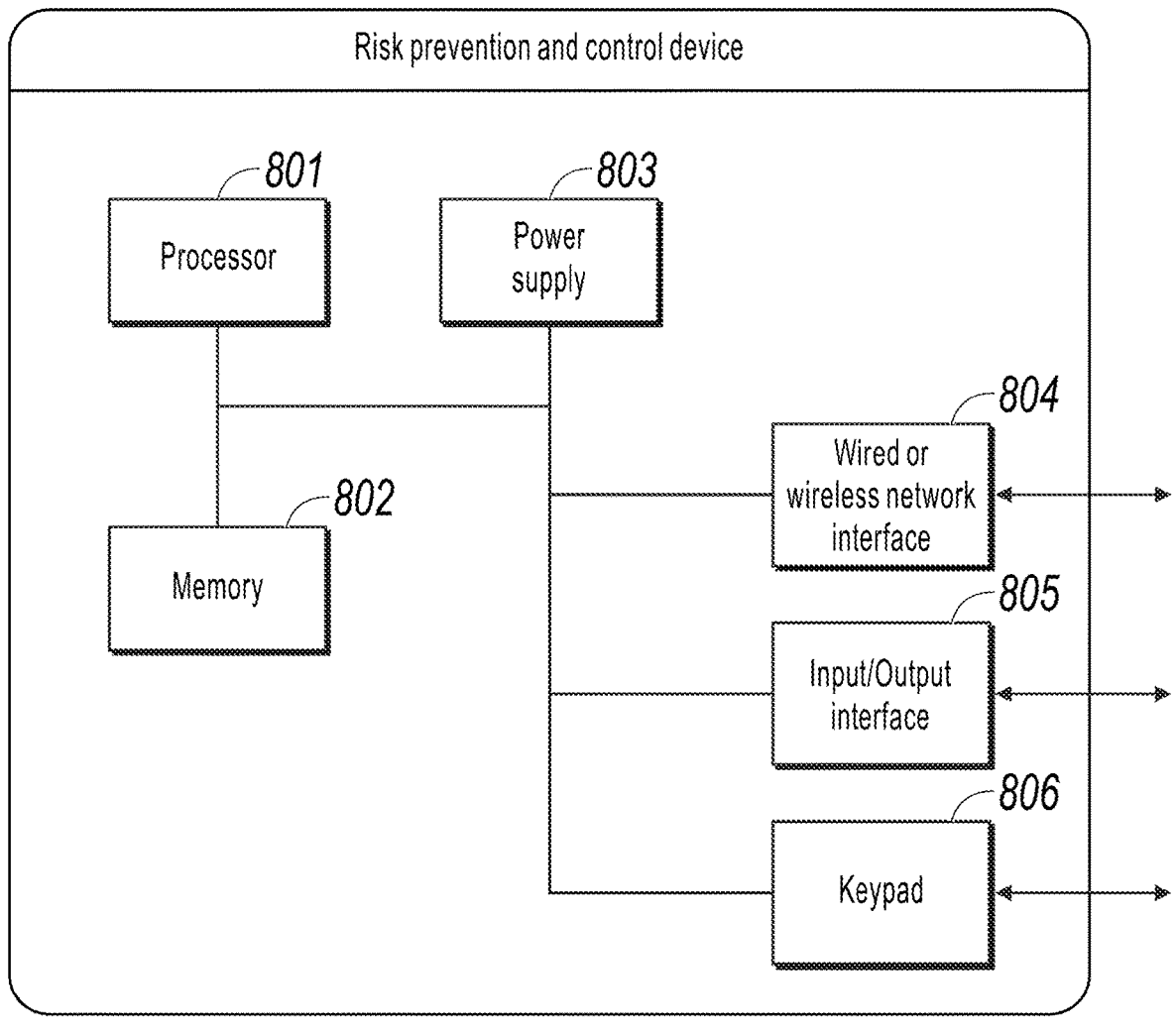
FIG. 8 shows some embodiments of a risk prevention and control device, according to this specification.

The risk prevention and control apparatus provided in some embodiments of this specification has been described above. Based on the same idea, some embodiments of this specification further provide a risk prevention and control device, as shown in FIG. 8.

The risk prevention and control device can be the server, the terminal device, or the like provided in some embodiments described above.

The risk prevention and control device can differ greatly because of a difference in configuration or performance, and can include one or more processors 801 and one or more memories 802. The memory 802 can store one or more application programs or data. The memory 802 can be a temporary storage or a persistent storage. The application program stored in the memory 802 can include one or more modules (not shown in the figure), and each module can include a series of computer-executable instructions in the risk prevention and control device. Still further, the processor 801 can be configured to communicate with the memory 802 to execute a series of computer-executable instructions in the memory 802 on the risk prevention and control device. The risk prevention and control device can further include one or more power supplies 803, one or more wired or wireless network interfaces 804, one or more input/output interfaces 805, one or more keypads 806, etc.

Specifically, in some embodiments, the risk prevention and control device includes a memory and one or more programs. The one or more programs are stored in the memory, and the one or more programs can include one or more modules, and each module can include a series of computer-executable instructions in the risk prevention and control device. One or more processors are configured to execute the computer-executable instructions included in the one or more programs to perform the following operations: receiving an initial risk prevention and control model, sent by a server, of a to-be-trained target service corresponding to a classification group that the device belongs to; performing model training on the initial risk prevention and control model based on pre-stored training sample data to obtain a risk prevention and control sub-model corresponding to the device, where the training sample data include at least data related to a user of the device and the target service; sending the risk prevention and control sub-model to the server such that the server performs model fusion processing on risk prevention and control sub-models provided by different terminal devices in the classification group that the device belongs to, to obtain a risk prevention and control model corresponding to the classification group that the device belongs to; and receiving the risk prevention and control model that is sent by the server and that corresponds to the classification group that the device belongs to, and performing risk prevention and control processing on the acquired data of the target service based on the risk prevention and control model.

In some embodiments of this specification, the initial risk prevention and control model is constructed by using a predetermined neural network model.

In some embodiments of this specification, the sending the risk prevention and control sub-model to the server includes: performing encryption processing on the risk prevention and control sub-model by using a predetermined first encryption algorithm to obtain an encrypted risk prevention and control sub-model, and sending the encrypted risk prevention and control sub-model to the server.

In some embodiments of this specification, the above-mentioned operations further include: receiving a to-be-trained first model sent by the server, where a parameter value of a model parameter in the first model is a randomly generated parameter value or a predetermined parameter value; performing model training on the first model based on the training sample data to obtain a trained first model, and acquiring a parameter in a predetermined network layer in the trained first model and a corresponding parameter value; and sending the parameter in the predetermined network layer in the trained first model and the corresponding parameter value to the server such that the server clusters different terminal devices based on parameters in predetermined network layers in trained first models provided by different terminal devices and corresponding parameter values to obtain classification groups that different terminal devices belong to.

In some embodiments of this specification, the first model is constructed by using a predetermined neural network model, and the first model is different from the initial risk prevention and control model.

In some embodiments of this specification, the classification group that the device belongs to is obtained by the server by clustering different terminal devices by using a predetermined clustering algorithm based on the parameters in the predetermined network layers in the trained first models provided by different terminal devices and the corresponding parameter values.

In some embodiments of this specification, the clustering algorithm is a K-means clustering algorithm.

In some embodiments of this specification, the sending the parameter in the predetermined network layer in the trained first model and the corresponding parameter value to the server includes: performing encryption processing on the parameter in the predetermined network layer in the trained first model and the corresponding parameter value by using a predetermined second encryption algorithm to obtain an encrypted parameter and a corresponding encrypted parameter value, and sending the encrypted parameter and the corresponding encrypted parameter value to the server.

In some embodiments of this specification, the performing risk prevention and control processing on the acquired data of the target service based on the risk prevention and control model includes: acquiring service data of the to-be-examined target service; inputting the service data into the risk prevention and control model so as to detect whether a predetermined risk exists in the service data, to obtain a corresponding detection result; and in response to that the detection result indicates that the predetermined risk exists in the service data, cancelling service processing performed by the device for the target service.

In some embodiments of this specification, the above-mentioned operations further include: in response to detecting that the training sample data are updated, acquiring updated training sample data; and performing model training on the risk prevention and control model based on the updated training sample data to obtain a trained risk prevention and control model, and performing risk prevention and control processing on the data of the target service based on the trained risk prevention and control model.

In some embodiments of this specification, the above-mentioned operations further include: in response to detecting that the training sample data are updated, acquiring updated training sample data; performing model training on the risk prevention and control model based on the updated training sample data to obtain a trained risk prevention and control model, and sending the trained risk prevention and control model to the server such that the server updates the risk prevention and control model corresponding to the classification group that the device belongs to, to obtain an updated risk prevention and control model; and receiving the updated risk prevention and control model sent by the server, and performing risk prevention and control processing on the data of the target service based on the updated risk prevention and control model.

In addition, specifically, in some embodiments, the risk prevention and control device includes a memory and one or more programs. The one or more programs are stored in the memory, and the one or more programs can include one or more modules, and each module can include a series of computer-executable instructions in the risk prevention and control device. One or more processors are configured to execute the computer-executable instructions included in the one or more programs to perform the following operations: acquiring information about a classification group that a terminal device belongs to; acquiring an initial risk prevention and control model of a to-be-trained target service corresponding to the classification group that the terminal device belongs to, based on the information about the classification group that the terminal device belongs to, and sending the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; receiving the risk prevention and control sub-model sent by the terminal device, and performing model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and sending the risk prevention and control model to the terminal device such that the terminal device performs risk prevention and control processing on the acquired data of the target service based on the risk prevention and control model.

In some embodiments of this specification, the above-mentioned operations further include: sending a to-be-trained first model to the terminal device, where a parameter value of a model parameter in the first model is a randomly generated parameter value or a predetermined parameter value such that the terminal device performs model training on the first model based on the training sample data to obtain a trained first model, and sends a parameter in a predetermined network layer in the trained first model and a corresponding parameter value to the device; and receiving the parameter in the predetermined network layer in the trained first model and the corresponding parameter value that are sent by the terminal device, and clustering the terminal device by using a predetermined clustering algorithm based on the parameter in the predetermined network layer in the trained first model and the corresponding parameter value to obtain the classification group that the terminal device belongs to.

In some embodiments of this specification, the above-mentioned operations further include: receiving the trained risk prevention and control model sent by the terminal device, where the trained risk prevention and control model is obtained by the terminal device, when detecting that the training sample data are updated, by performing model training on the risk prevention and control model based on the updated training sample data; updating the risk prevention and control model corresponding to the classification group that the terminal device belongs to, based on the trained risk prevention and control model, to obtain an updated risk prevention and control model; and sending the updated risk prevention and control model to the terminal device such that the terminal device performs risk prevention and control processing on the data of the target service based on the updated risk prevention and control model.

According to the risk prevention and control device provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Embodiment 8

Further, based on the above-mentioned methods shown in FIG. 1A and FIG. 5, one or more embodiments of this specification further provide a storage medium, configured to store computer-executable instruction information. In some specific embodiments, the storage medium can be a USB flash drive, an optical disc, a hard disk, etc., and the computer-executable instruction information stored in the storage medium can be executed by the processor to implement the following procedure: receiving an initial risk prevention and control model, sent by a server, of a to-be-trained target service corresponding to a classification group that the terminal device belongs to; performing model training on the initial risk prevention and control model based on pre-stored training sample data to obtain a risk prevention and control sub-model corresponding to the terminal device, where the training sample data include at least data related to a user of the terminal device and the target service; sending the risk prevention and control sub-model to the server such that the server performs model fusion processing on risk prevention and control sub-models provided by different terminal devices in the classification group that the terminal device belongs to, to obtain a risk prevention and control model corresponding to the classification group that the terminal device belongs to; and receiving the risk prevention and control model that is sent by the server and that corresponds to the classification group that the terminal device belongs to, and performing risk prevention and control processing on the acquired data of the target service based on the risk prevention and control model.

In some embodiments of this specification, the initial risk prevention and control model is constructed by using a predetermined neural network model.

In some embodiments of this specification, the sending the risk prevention and control sub-model to the server includes: performing encryption processing on the risk prevention and control sub-model by using a predetermined first encryption algorithm to obtain an encrypted risk prevention and control sub-model, and sending the encrypted risk prevention and control sub-model to the server.

In some embodiments of this specification, the above-mentioned procedure further includes: receiving a to-be-trained first model sent by the server, where a parameter value of a model parameter in the first model is a randomly generated parameter value or a predetermined parameter value; performing model training on the first model based on the training sample data to obtain a trained first model, and acquiring a parameter in a predetermined network layer in the trained first model and a corresponding parameter value; and sending the parameter in the predetermined network layer in the trained first model and the corresponding parameter value to the server such that the server clusters different terminal devices based on parameters in predetermined network layers in trained first models provided by different terminal devices and corresponding parameter values to obtain classification groups that different terminal devices belong to.

In some embodiments of this specification, the first model is constructed by using a predetermined neural network model, and the first model is different from the initial risk prevention and control model.

In some embodiments of this specification, the classification group that the terminal device belongs to is obtained by the server by clustering different terminal devices by using a predetermined clustering algorithm based on the parameters in the predetermined network layers in the trained first models provided by different terminal devices and the corresponding parameter values.

In some embodiments of this specification, the clustering algorithm is a K-means clustering algorithm.

In some embodiments of this specification, the sending the parameter in the predetermined network layer in the trained first model and the corresponding parameter value to the server includes: performing encryption processing on the parameter in the predetermined network layer in the trained first model and the corresponding parameter value by using a predetermined second encryption algorithm to obtain an encrypted parameter and a corresponding encrypted parameter value, and sending the encrypted parameter and the corresponding encrypted parameter value to the server.

In some embodiments of this specification, the performing risk prevention and control processing on the acquired data of the target service based on the risk prevention and control model includes: acquiring service data of the to-be-examined target service; inputting the service data into the risk prevention and control model so as to detect whether a predetermined risk exists in the service data, to obtain a corresponding detection result; and in response to that the detection result indicates that the predetermined risk exists in the service data, cancelling service processing performed by the terminal device for the target service.

In some embodiments of this specification, the above-mentioned procedure further includes: in response to detecting that the training sample data are updated, acquiring updated training sample data; and performing model training on the risk prevention and control model based on the updated training sample data to obtain a trained risk prevention and control model, and performing risk prevention and control processing on the data of the target service based on the trained risk prevention and control model.

In some embodiments of this specification, the above-mentioned procedure further includes: in response to detecting that the training sample data are updated, acquiring updated training sample data; performing model training on the risk prevention and control model based on the updated training sample data to obtain a trained risk prevention and control model, and sending the trained risk prevention and control model to the server such that the server updates the risk prevention and control model corresponding to the classification group that the terminal device belongs to, to obtain an updated risk prevention and control model; and receiving the updated risk prevention and control model sent by the server, and performing risk prevention and control processing on the data of the target service based on the updated risk prevention and control model.

In some other specific embodiments, the storage medium can be a USB flash drive, an optical disc, a hard disk, etc., and the computer-executable instruction information stored in the storage medium can be executed by the processor to implement the following procedure: acquiring information about a classification group that a terminal device belongs to; acquiring an initial risk prevention and control model of a to-be-trained target service corresponding to the classification group that the terminal device belongs to, based on the information about the classification group that the terminal device belongs to, and sending the initial risk prevention and control model to the terminal device such that the terminal device performs model training on the initial risk prevention and control model based on pre-stored training sample data to obtain a risk prevention and control sub-model corresponding to the terminal device, where the training sample data include at least data related to a user of the terminal device and the target service; receiving the risk prevention and control sub-model sent by the terminal device, and performing model fusion processing on the risk prevention and control sub-model sent by the terminal device and a risk prevention and control sub-model provided by another terminal device in the classification group that the terminal device belongs to, to obtain a risk prevention and control model corresponding to the classification group that the terminal device belongs to, where the risk prevention and control sub-model provided by the another terminal device is obtained by the another terminal device by performing model training on the initial risk prevention and control model based on training sample data pre-stored in the another terminal device; and sending the risk prevention and control model to the terminal device such that the terminal device performs risk prevention and control processing on the acquired data of the target service based on the risk prevention and control model.

In some embodiments of this specification, the above-mentioned procedure further includes: sending a to-be-trained first model to the terminal device, where a parameter value of a model parameter in the first model is a randomly generated parameter value or a predetermined parameter value such that the terminal device performs model training on the first model based on the training sample data to obtain a trained first model, and sends a parameter in a predetermined network layer in the trained first model and a corresponding parameter value to the server; and receiving the parameter in the predetermined network layer in the trained first model and the corresponding parameter value that are sent by the terminal device, and clustering the terminal device by using a predetermined clustering algorithm based on the parameter in the predetermined network layer in the trained first model and the corresponding parameter value to obtain the classification group that the terminal device belongs to.

In some embodiments of this specification, the above-mentioned procedure further includes: receiving the trained risk prevention and control model sent by the terminal device, where the trained risk prevention and control model is obtained by the terminal device, when detecting that the training sample data are updated, by performing model training on the risk prevention and control model based on the updated training sample data; updating the risk prevention and control model corresponding to the classification group that the terminal device belongs to, based on the trained risk prevention and control model, to obtain an updated risk prevention and control model; and sending the updated risk prevention and control model to the terminal device such that the terminal device performs risk prevention and control processing on the data of the target service based on the updated risk prevention and control model.

According to the storage medium provided in some embodiments of this specification, when an initial risk prevention and control model, sent by a server, of a to-be-trained target service corresponding to a classification group that the terminal device belongs to is received, model training is performed on the initial risk prevention and control model based on pre-stored training sample data to obtain a risk prevention and control sub-model corresponding to the terminal device, where the training sample data include at least data related to a user of the terminal device and the target service; then the risk prevention and control sub-model is sent to the server; the server performs model fusion processing on risk prevention and control sub-models provided by different terminal devices in the classification group that the terminal device belongs to, to obtain a risk prevention and control model corresponding to the classification group that the terminal device belongs to; the terminal device performs risk prevention and control processing on the acquired data of the target service by using the risk prevention and control model that is provided by the server and that corresponds to the classification group that the terminal device belongs to. As such, the risk prevention and control model is determined through federated learning, thereby implementing personalized risk prevention and control that is based on shared learning between a terminal device and a server. In addition, the above-mentioned method can not only protect privacy data, but also reduce interaction between the terminal device and the server, thereby reducing computing pressure of the server, and improving flexibility of a risk prevention and control model.

In addition, clustering is performed based on related data of the user to customize a personalized risk prevention and control model for a user of each classification group. In addition, the risk prevention and control model is trained through federated learning by using a clustering algorithm. As such, the data in your high-end device do not need to be transmitted to the server, thereby protecting user privacy.

Some specific embodiments of this specification are described above. Other embodiments fall within the scope of the appended claims. In some cases, actions or steps described in the claims can be performed in a sequence different from that in some embodiments and desired results can still be achieved. In addition, processes described in the accompanying drawings do not necessarily need a specific order or a sequential order shown to achieve the desired results. In some implementations, multi-tasking and parallel processing are also possible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

Some embodiments of this specification are described with reference to flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable fraudulent case serial-parallel device to generate a machine such that the instructions executed by the computer or the processor of the another programmable fraudulent case serial-parallel device generate an apparatus for implementing a specific function in one or more processes in the flowcharts and/or in one or more blocks in the block diagrams.

These computer program instructions can be stored in a computer-readable memory that can instruct the computer or the another programmable fraudulent case serial-parallel device to work in a specific way such that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable fraudulent case serial-parallel device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be accessed by a computing device. Based on the definition in this specification, the computer-readable medium does not include transitory media such as a modulated data signal and carrier.

The terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some system embodiments are briefly described since they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A computer-implemented method for terminal device risk prevention and control, comprising:

receiving, from a server, an initial risk prevention and control model of a to-be-trained target service corresponding to a classification group that a terminal device belongs to;

performing, to obtain a risk prevention and control sub-model corresponding to the terminal device and based on pre-stored training sample data, model training on the initial risk prevention and control model, wherein the pre-stored training sample data comprises at least data related to a user of the terminal device and the to-be-trained target service;

sending, to the server to obtain a risk prevention and control model corresponding to the classification group that the terminal device belongs to, the risk prevention and control sub-model, such that the server performs model fusion processing on risk prevention and control sub-models provided by different terminal devices in the classification group that the terminal device belongs to;

receiving, as acquired data of the to-be-trained target service based on the risk prevention and control model, the risk prevention and control model that is sent by the server and that corresponds to the classification group that the terminal device belongs to; and performing risk prevention and control processing on the acquired data of the to-be-trained target service based on the risk prevention and control model.

2. The computer-implemented method of claim 1, wherein the initial risk prevention and control model is constructed by using a predetermined neural network model.

3. The computer-implemented method of claim 1, wherein sending the risk prevention and control sub-model to the server, comprises:

performing encryption processing on the risk prevention and control sub-model by using a predetermined first encryption algorithm to obtain an encrypted risk prevention and control sub-model, and sending the encrypted risk prevention and control sub-model to the server.

4. The computer-implemented method of claim 1, comprising:

receiving a to-be-trained first model sent by the server, wherein a parameter value of a model parameter in the to-be-trained first model is a randomly generated parameter value or a predetermined parameter value;

performing model training on the to-be-trained first model based on the pre-stored training sample data to obtain a trained first model, and acquiring a parameter in a predetermined network layer in the trained first model and a corresponding parameter value; and sending the parameter in the predetermined network layer in the trained first model and the corresponding parameter value to the server such that the server clusters different terminal devices based on parameters in predetermined network layers in trained first models provided by different terminal devices and corresponding parameter values to obtain classification groups that different terminal devices belong to.

5. The computer-implemented method of claim 4, wherein:

the to-be-trained first model is constructed by using a predetermined neural network model; and the to-be-trained first model is different from the initial risk prevention and control model.

6. The computer-implemented method of claim 4, wherein the classification group that the terminal device belongs to is obtained by the server by clustering different terminal devices by using a predetermined clustering algorithm based on parameters in predetermined network layers in trained first models provided by different terminal devices and corresponding parameter values.

7. The computer-implemented method of claim 6, wherein the predetermined clustering algorithm is a K-means clustering algorithm.

8. The computer-implemented method of claim 4, wherein sending the parameter in the predetermined network layer in the trained first model and the corresponding parameter value to the server, comprises:

performing encryption processing on the parameter in the predetermined network layer in the trained first model and the corresponding parameter value by using a predetermined second encryption algorithm to obtain an encrypted parameter and a corresponding encrypted parameter value; and sending the encrypted parameter and the corresponding encrypted parameter value to the server.

9. The computer-implemented method of claim 1, wherein performing risk prevention and control processing on the acquired data of the to-be-trained target service based on the risk prevention and control model, comprises:

acquiring service data of a to-be-detected target service.

10. The computer-implemented method of claim 9, comprising:

inputting the service data into the risk prevention and control model so as to detect, as a corresponding detection result, whether a predetermined risk exists in the service data.

11. The computer-implemented method of claim 10, comprising:

in response to an indication by the corresponding detection result that the predetermined risk exists in the service data, cancelling service processing performed by the terminal device for the to-be-trained target service.

12. The computer-implemented method of claim 1, comprising:

in response to a detection that the pre-stored training sample data is updated, acquiring updated training sample data.

13. The computer-implemented method of claim 12, comprising:

performing, based on the updated training sample data and to obtain a trained risk prevention and control model, model training on the risk prevention and control model.

14. The computer-implemented method of claim 13, comprising:

performing, based on the trained risk prevention and control model, risk prevention and control processing on the acquired data of the to-be-trained target service.

15. The computer-implemented method of claim 1, comprising:

in response to detecting that the pre-stored training sample data are updated, acquiring updated training sample data.

16. The computer-implemented method of claim 15, comprising:

performing model training on the risk prevention and control model based on the updated training sample data to obtain a trained risk prevention and control model.

17. The computer-implemented method of claim 16, comprising:

sending, to obtain an updated risk prevention and control model, the trained risk prevention and control model to the server, such that the server updates the risk prevention and control model corresponding to the classification group that the terminal device belongs to.

18. The computer-implemented method of claim 17, comprising:

receiving the updated risk prevention and control model sent by the server; and performing, based on the updated risk prevention and control model, risk prevention and control processing on the acquired data of the to-be-trained target service.

19. A non-transitory, computer-readable medium storing one or more instructions executable by a computer system to perform one or more operations for terminal device risk prevention and control, comprising:

receiving, from a server, an initial risk prevention and control model of a to-be-trained target service corresponding to a classification group that a terminal device belongs to;

performing, to obtain a risk prevention and control sub-model corresponding to the terminal device and based on pre-stored training sample data, model training on the initial risk prevention and control model, wherein the pre-stored training sample data comprises at least data related to a user of the terminal device and the to-be-trained target service;

sending, to the server to obtain a risk prevention and control model corresponding to the classification group that the terminal device belongs to, the risk prevention and control sub-model, such that the server performs model fusion processing on risk prevention and control sub-models provided by different terminal devices in the classification group that the terminal device belongs to;

receiving, as acquired data of the to-be-trained target service based on the risk prevention and control model, the risk prevention and control model that is sent by the server and that corresponds to the classification group that the terminal device belongs to; and performing risk prevention and control processing on the acquired data of the to-be-trained target service based on the risk prevention and control model.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for terminal device risk prevention and control, comprising:

receiving, from a server, an initial risk prevention and control model of a to-be-trained target service corresponding to a classification group that a terminal device belongs to;

performing, to obtain a risk prevention and control sub-model corresponding to the terminal device and based on pre-stored training sample data, model training on the initial risk prevention and control model, wherein the pre-stored training sample data comprises at least data related to a user of the terminal device and the to-be-trained target service;

sending, to the server to obtain a risk prevention and control model corresponding to the classification group that the terminal device belongs to, the risk prevention and control sub-model, such that the server performs model fusion processing on risk prevention and control sub-models provided by different terminal devices in the classification group that the terminal device belongs to;

receiving, as acquired data of the to-be-trained target service based on the risk prevention and control model, the risk prevention and control model that is sent by the server and that corresponds to the classification group that the terminal device belongs to; and performing risk prevention and control processing on the acquired data of the to-be-trained target service based on the risk prevention and control model.

* * * * *